G. WEISS.
MACHINE FOR MAKING HOLLOW CONCRETE TILE.
APPLICATION FILED DEC. 19, 1913.
1,159,448.
Patented Nov. 9, 1915.
5 SHEETS—SHEET 2.
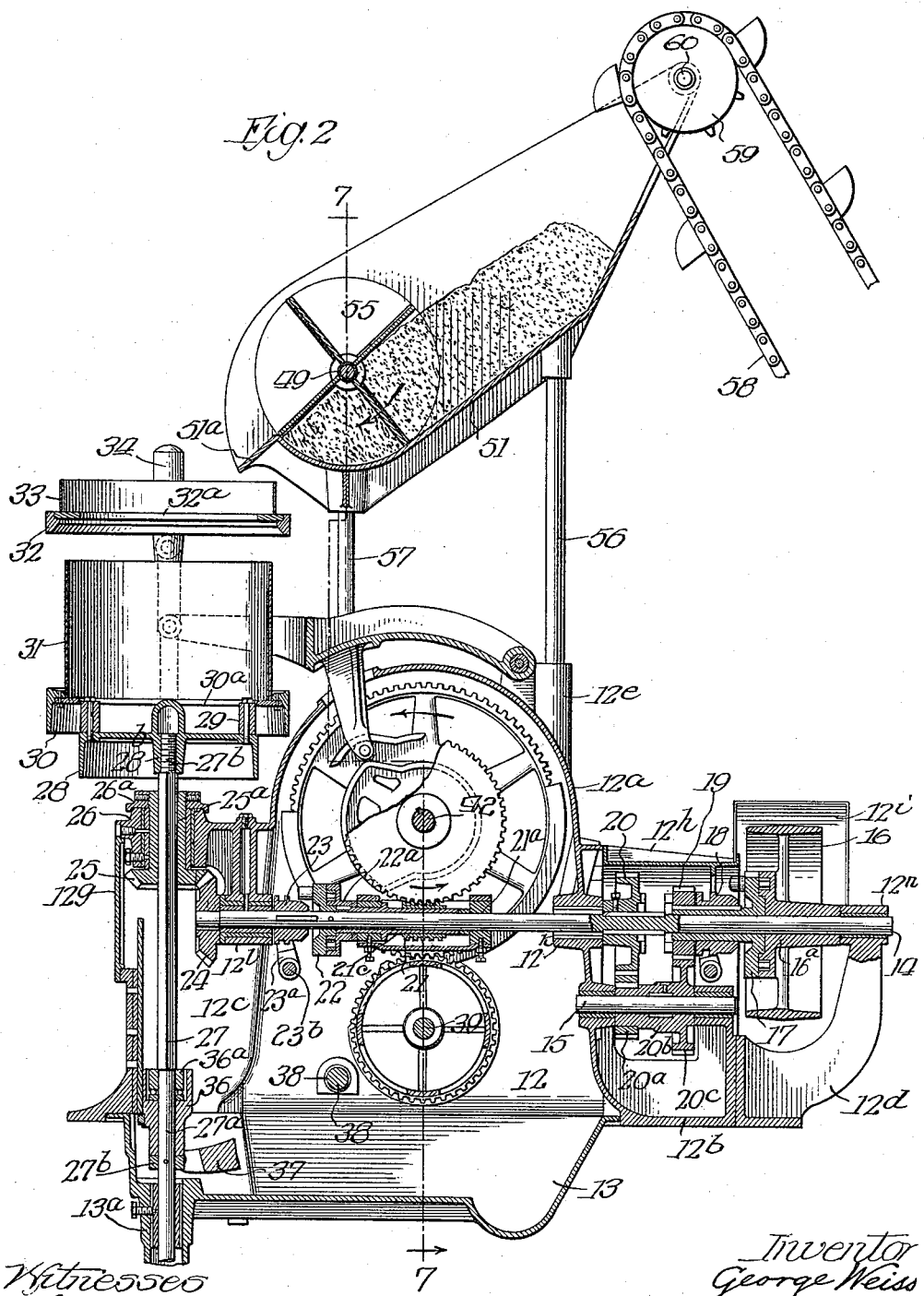

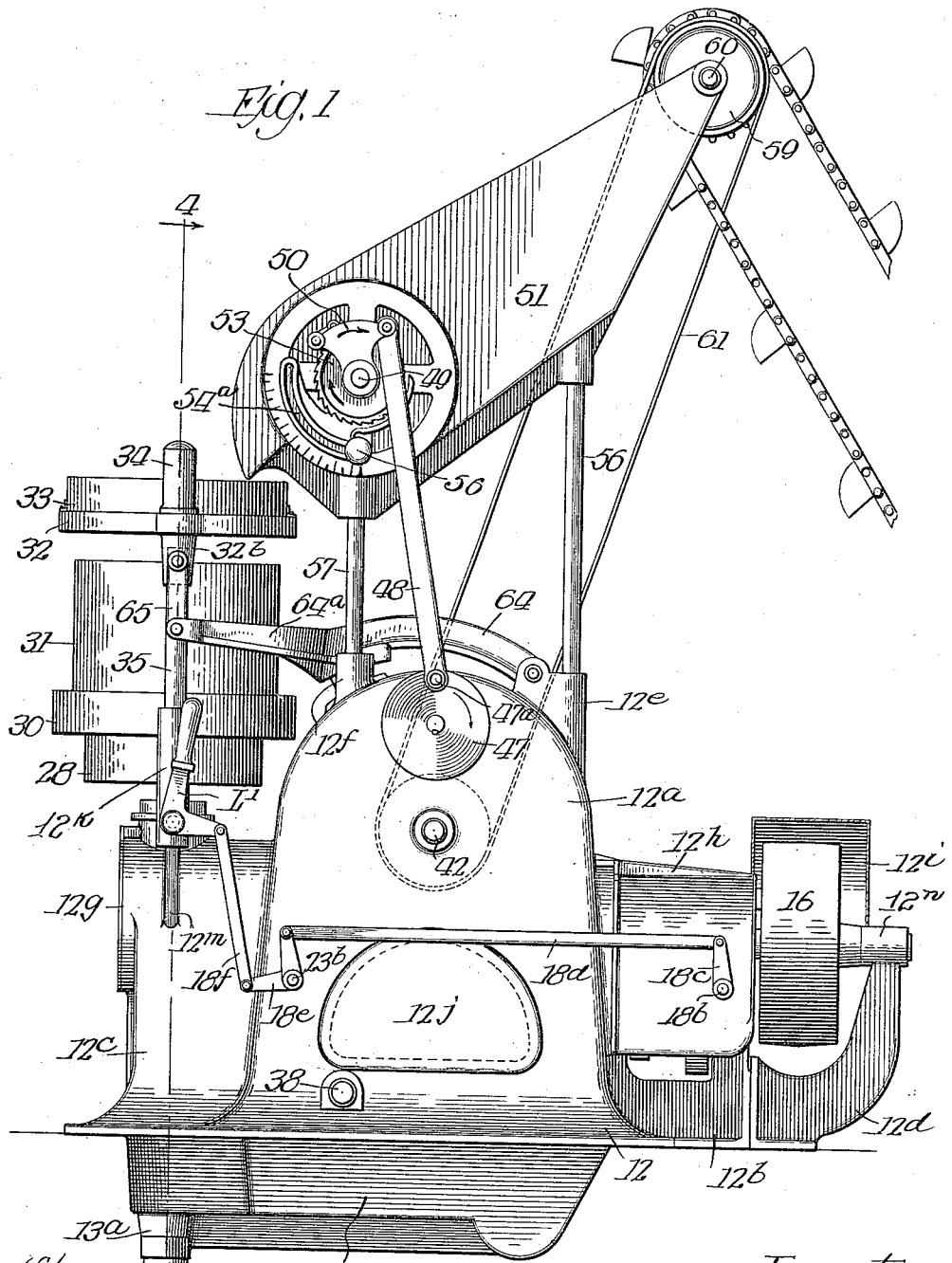

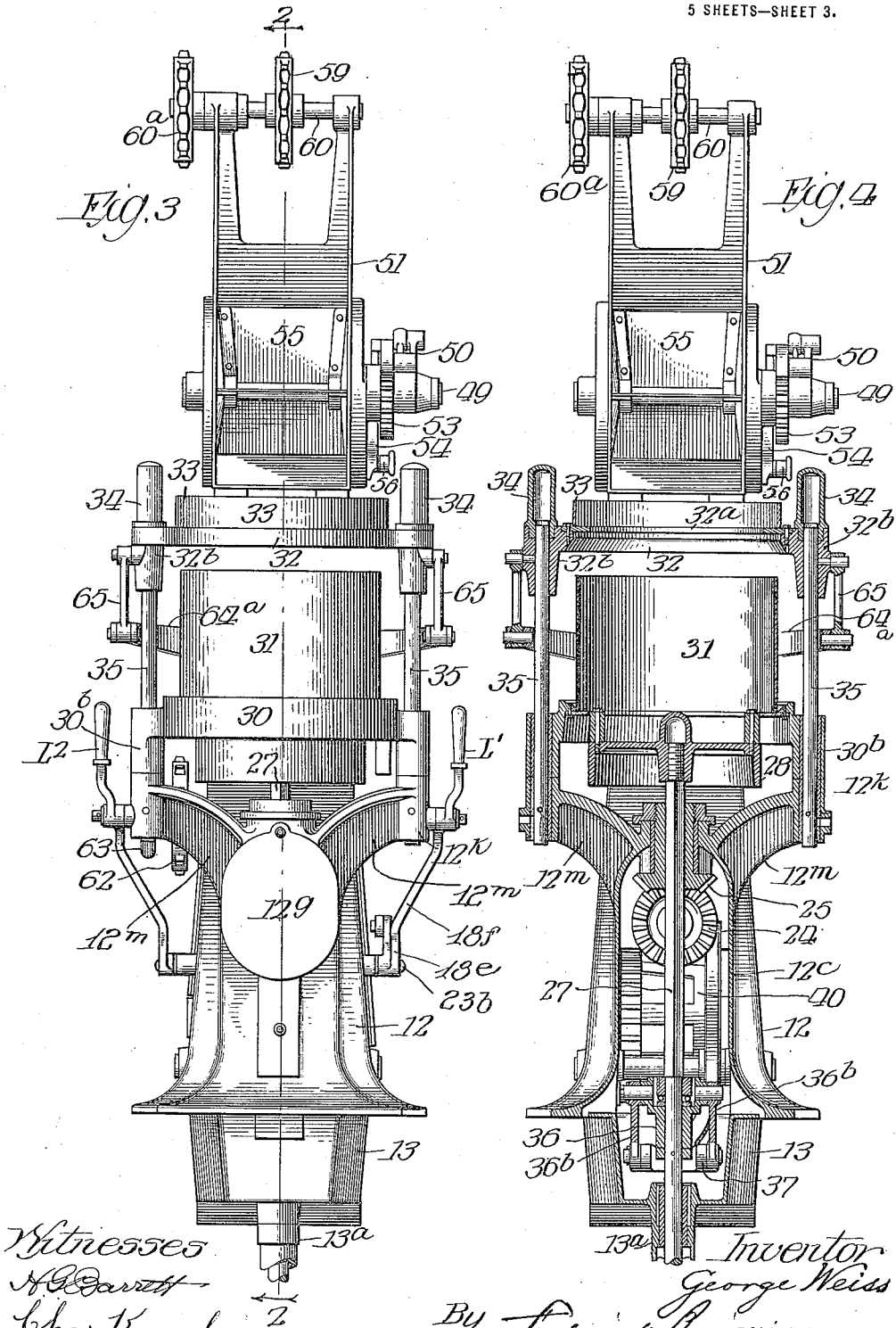

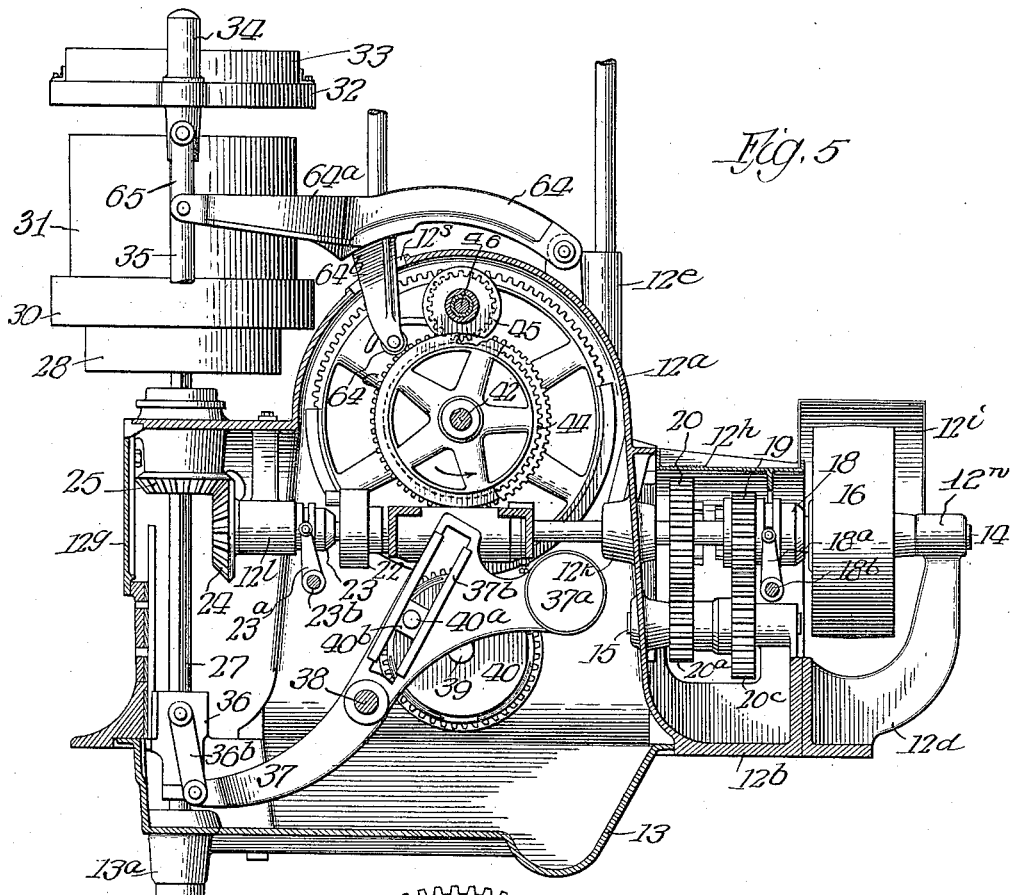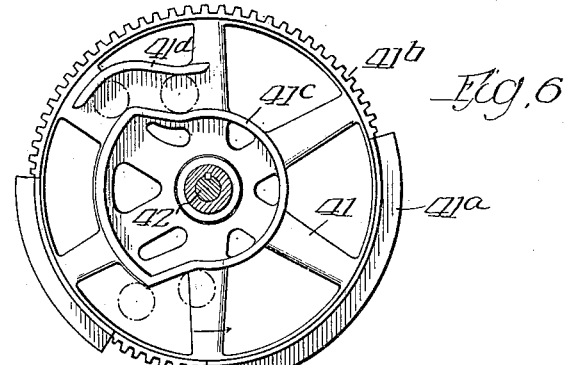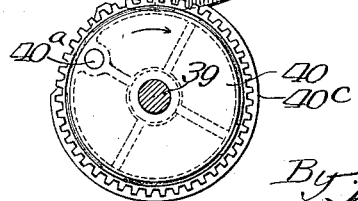

G. WEISS.
MACHINE FOR MAKING HOLLOW CONCRETE TILE.
APPLICATION FILED DEC. 19, 1913.
1,159,448.
Patented Nov. 9, 1915.
5 SHEETS—SHEET 5.
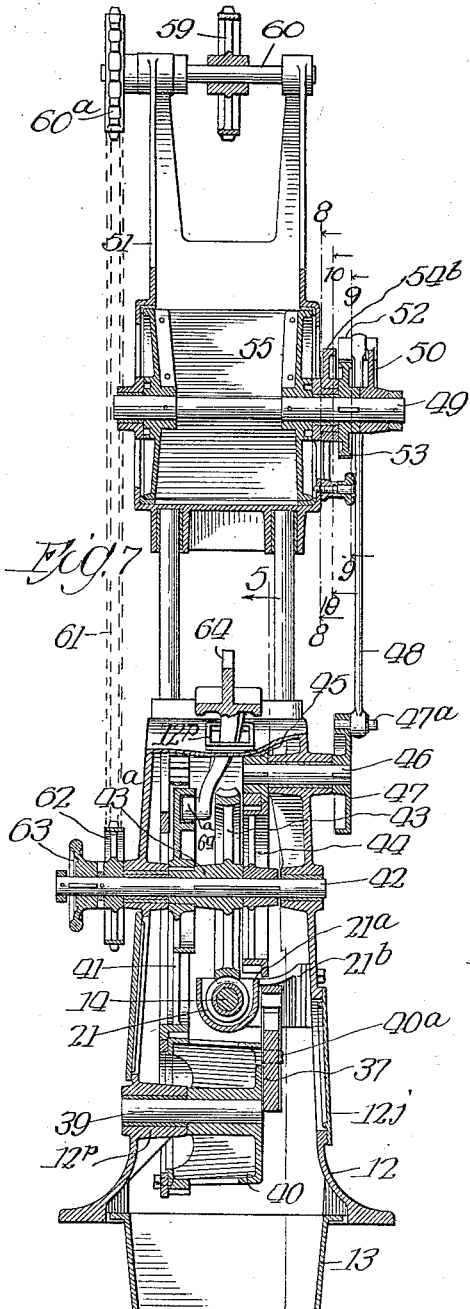
Witnesses:
Inventor
George Weiss.
By Frederick Benjamin
Atty.

ated Nov. 9, 1915.

UNITED STATES PATENT OFFICE.

GEORGE WEISS, OF CHICAGO, ILLINOIS, ASSIGNOR TO W. E. DUNN MANUFACTURING COMPANY, OF CHICAGO, ILLINOIS, A CORPORATION OF ILLINOIS.

MACHINE FOR MAKING HOLLOW CONCRETE TILE.

1,159,448.     Specification of Letters Patent.     Patented Nov. 9, 1915.

Application filed December 19, 1913. Serial No. 807,595.

*To all whom it may concern:*

Be it known that I, GEORGE WEISS, a citizen of the United States, residing at Chicago, in the county of Cook and State of Illinois, have invented certain new and useful Improvements in Machines for Making Hollow Concrete Tile, of which the following is a specification.

My present invention relates to improvements in machines for making pipe or cylindrical tile from cement concrete.

The especial object of my improvements is to produce a machine of strong and compact construction with which the tile may be accurately and quickly formed.

A further object is to provide a power driven tile making machine in which the bearings will be protected from the cement dust which prevails to a greater or less extent as an incident to the manufacture of cement concrete products.

A still further object is to produce a power driven tile machine which may be completely controlled by one man through the manipulation of but two hand levers.

An additional object is to provide a series of mechanical elements or members so arranged in combination that the feeding of the concrete to the mold and the packing of same within the latter will be properly synchronized, and each step of the manufacture effected without jar, vibration or undue friction in the complete mechanism.

Having the aforegoing and other objects of general utility in view, I have invented the machine shown in a preferred form in the following views of the accompanying drawing.

Figure 1 is a side elevation of the complete machine embraced by my invention; Fig. 2 shows a vertical sectional view on the line 2—2 of Fig. 3; Fig. 3 is an elevational view taken at the front end of the complete machine; Fig. 4 is a vertical sectional view on the line 4—4 of Fig. 1; Fig. 5 is a sectional view on the line 5—5 of Fig. 7; Fig. 6 is a detail in elevation of a cam-gear and its driving member which constitute important elements of my machine; Fig. 7 is a vertical sectional view on the line 7—7 of Fig. 2; Fig. 8 is a fragmentary detail in section, on the line 8—8 of Fig. 7; Fig. 9 is a detail on the line 9—9 of Fig. 7; Fig. 10 is a sectional view on the line 10—10 of Fig. 7, and Fig. 11 is a top plan view of the intermittent drive for the concrete feeding drum or gate, the separate members of which are shown in Figs. 8, 9, and 10.

Like reference characters indicate corresponding parts throughout the several views.

Referring to the details of the drawing, the numeral 12 represents the main frame of my machine, the same being a hollow cast-iron dome-like structure which constitutes a protective housing for the major portion of the power driven members of the machine. As best shown in Figs. 1, 2, and 5, the frame 12 is formed with a semi-cylindrical hood portion $12^a$, with a lower rearward extension $12^b$, and a front extension $12^c$. Secured to the rear side of the extension $12^b$, is a bracket $12^d$, and on the hood $12^a$, are tubular vertical projections $12^e$, $12^f$. On the front side of the extension $12^c$ is a cover plate $12^g$, which is removably applied to an opening formed in the vertical wall of said extension. A cover plate or hood $12^h$ is also detachably secured to the extension $12^b$; a pulley guard $12^i$ is arranged above the bracket $12^d$, and a cover-plate $12^j$ is applied to an opening in the side of the frame 12. Two horizontal shaft bearings $12^k$, $12^l$, are cast with the main frame.

Suitably secured to the lower side of the frame 12, is a hollow sub-base member 13, which is formed at its forward end with a cylindrical bearing $13^a$.

14 represents the main drive shaft of my machine. Near its forward end it is journaled in the bearing $12^l$, passes through the bearing $12^k$, and at its rear end is journaled in the bearing $12^n$, at the upper end of the bracket $12^d$.

15 represents a short counter-shaft, which is journaled in bearings at the upper edge of the extension $12^b$ (Fig. 2). Near the rear end of the shaft 14, is a loose running pulley 16, having at one side a friction clutch member $16^a$, which is engaged by a clutch disk 17, loosely mounted on the shaft 14. The disk 17 is formed with a hub extension, on which is slidably splined a clutch collar 18, and a pinion 19. Adjacent the pinion 19, a somewhat larger pinion 20 is keyed on the shaft 14. The pinion 20 is in constant mesh with the teeth $20^a$ of a double pinion $20^b$, which is mounted on the shaft 15, and the teeth $20^c$ of which are adapted to engage the pinion 19 (Fig. 2) when the latter is shifted to operative or engaging position by the movement of the clutch collar 18. The clutch-collar movement is directly effected by the usual fork 18$^a$, which rocks with the stud-shaft 18$^b$ on which it is mounted. The proximate faces of the pinions 19 and 20, are formed with interengaging projections or teeth, whereby, when they are brought together by the lateral movement of the pinion 19, the power derived from the pulley 16 through the friction clutch 16$^a$, 17, will be directly communicated to the pinion 20, instead of through the double gear 20$^b$, thus providing variation in the speed at which the shaft 14 may be driven. While I have thus shown and described in detail variable speed and friction drive means in this connection I claim no novelty for same, and any suitable driving and transmission means may be employed.

21 represents a worm which is loosely arranged on the shaft 14, midway the bearings 12$^k$—12$^l$ (Fig. 2) and is housed within a box 21$^a$, which has a bracket 21$^b$ on one side extending over to the opposite wall of the frame 12, to which it is secured (Fig. 7). This worm is formed with an extended hub 21$^c$, on the forward end of which is keyed a friction clutch member 22$^a$, which has a complementary clutch member 22, pinned to the shaft 14. These clutch members are adapted to be thrown into operative engagement by the clutch block or collar 23, which is slidingly splined on the shaft 14, and is equipped with the usual fork 23$^a$, on the rock-shaft 23$^b$.

On the forward end of the shaft 14, is keyed a bevel-gear 24, in mesh with a gear 25, which is fitted to the upper part of a rectangular (in cross-section) vertical spindle 27. The gear 25 is formed with an upwardly extending hub 25$^a$ which provides a long bearing for the spindle to slide in, and said hub is mounted in a bearing 26 which is cast in the frame 12, and is provided with suitable boxes and lubricating means. The upper end of the extension 25$^a$ is threaded, and has a screw-cap 26$^a$ secured thereto.

The lower portion of the spindle 27 is round, as at 27$^a$, and this rounded portion passes through an anti-frictional bearing 36$^a$, arranged in a sleeve 36, which is held upon the shaft 27 between a fixed nut 27$^b$, and the shoulder formed at the junction of the squared and rounded portions of the spindle. The lower portion of the spindle slides through a suitable box in the bearing 13$^a$.

The upper end of the spindle 27 is threaded, as at 27$^b$, to receive a boss 28$^b$ on the lower side of a circular packing-head 28, to the upper side of which are secured the packing shoes 29.

30 represents the lower circular die-ring to which is removably fitted a thin flat collar 30$^a$ upon which is placed the mold 31 which may be of any desired construction.

32 indicates the upper die ring which is fitted with a collar 32$^a$, and is also provided with a vertical flange 33.

As best shown in Figs. 3 and 4, the die-ring 30 is formed on opposite edges with tubular extensions 30$^b$, which rest upon corresponding extensions 12$^k$ on the laterally projecting frame-arms or brackets 12$^m$. The die-ring 32 is formed with tubular extensions 32$^b$, which are in vertical alinement with the projections 30$^b$. Fitted to the upper ends of the extensions 32$^b$ are vertical cylindrical boxes 34, the bores of which register with the bores of said extensions. The extensions 30$^b$, 32$^b$, are slidably arranged on posts 35, the lower ends of which are fixed in the frame bracket members 12$^k$.

The sleeve 36, near the lower end of the spindle 27 has links 36$^b$ connected with its opposite sides, and these links are connected at their lower ends with the lower and forked end of a lever 37, which is rockably mounted on a shaft 38, which extends transversely of the frame 12, near the lower edge of the latter (Fig. 5). The lever 37 is provided with a counterweight 37$^a$, and a flanged slideway 37$^b$ above its pivotal point.

A stud-shaft 39 (Figs. 5 and 7) extends part way across the lower part of the frame 12, and has a long bearing 12$^p$ thereon. On the shaft 39 is mounted a gear 40 from one side of which projects a pin 40$^a$, on which is mounted a block 40$^b$, which is arranged in the slideway 37$^b$. The gear 40 is formed with a flange 40$^c$ at one side of the teeth, and said flange is cut away at two points (Fig. 6). The teeth of the gear 40 mesh with the teeth 41$^b$ of the mutilated gear 41 which is keyed on the hub 43$^a$ of the worm gear 43, which in turn is keyed on the shaft 42 which is journaled in bearings on the side walls of the upper portion 12$^a$ of the frame 12. Where the teeth 41$^b$ are absent, this gear has a flange 41$^a$ which coincides with and rides upon, the cutaway portion of the flange 40$^c$ of the gear 40. Cast on one side of the spokes of the gear 41, is an irregular cam formed by flanges 41$^c$, 41$^d$.

Keyed on the shaft 42, adjacent the worm-gear 43, is a mutilated gear 44, the toothed portion of which engages the teeth of a pinion 45 keyed on the inner end of a shaft 46 journaled in the frame 12$^a$ (Fig. 7). On the outer end of this shaft is keyed a disk-wheel 47 from which projects a crank-pin 47$^a$, to which is connected the lower end of a pitman rod 48, the upper end of which is connected with one arm of a 2-arm lever 50, loosely arranged on a shaft 49, journaled in the side walls of a chute 51. On the other arm of the lever 50 is pivoted a pawl 52 (Figs. 9 and 11) the point of which engages the teeth of a ratchet wheel 53 which is keyed on the shaft 49. Adjacent the ratchet wheel 53, is a cam 54, in which is a slot 54$^a$, and a cam surface 54ᵇ, concentric with the shaft 49. This cam is adjustable relative to a disk 55 fixed on the shaft 49, and is held in its adjusted position by a set screw 56 which passes through the slot 54ᵃ and engages a hole in the disk. The cam-surface 54ᵇ is arranged in the path of the free end of the pawl 52 which is equipped with a small roller 52ᵃ which rides on said surface, throws the pawl out of engagement with the ratchet wheel, and thus effects an intermission in the rotary movement of the gate 55, which is secured to the shaft 49 within the walls of the chute 51, and is best shown in Fig. 2. The bottom of the chute 51 is curved to conform to the periphery of the gate, and at its discharge end is formed with a downwardly projecting lip 51ᵃ, so positioned as to discharge the concrete within the flange 33 on the die-ring 32. The chute is supported by posts 56, 57, which are set in the bosses 12ᵉ, 12ᶠ, on the frame 12ᵃ.

The chute is supplied with concrete from any suitable source of supply, by an endless conveyer 58 which travels over a sprocket wheel 59 centrally arranged on a shaft 60 at the upper end of the chute. On one end of the shaft is a sprocket-wheel 60ᵃ which is driven by a sprocket-chain 61, which connects with and is driven by a sprocket-wheel 62 near one end of the shaft 42. The sprocket 62 is loose on the shaft 42, but is thrown into operative engagement therewith by a hand-operated clutch-wheel or disk 63 which is feathered on said shaft (Fig. 7). On an offset of the projection 12ᵉ, is pivoted a lever 64, which for a portion of its length is arched and is then divided into two arms 64ᵃ, which extend on opposite sides of the mold 31, and are pivotally connected to the lower ends of links 65, the upper ends of which are pivoted on the upper die extensions 32ᵇ. The lever 64 is formed with a downwardly extending arm 64ᵇ which passes through an opening 12ˢ provided therefor in the frame 12ᵃ, and carries at its lower end a roller 64ᶜ, (Fig. 5) which rides upon the cam surfaces 41ᶜ, 41ᵈ, as the cam 41 rotates.

On the outer end of the rock shaft 18ᵇ is an arm 18ᶜ to which is connected a link 18ᵈ which extends forwardly and is connected with one end of a bell-crank 18ᵉ which is loose on the shaft 23ᵇ, and the other end of which is connected by a link 18ᶠ to a bell-crank hand-operated lever L¹, pivoted on a stud extending horizontally from the frame extension 12ᵏ. A similar bell-crank lever L² is pivoted on the opposite extension 12ᵏ, and is linked to the rock-shaft 23ᵇ, so as to rock the latter, but this link is not shown in the drawing, as the construction is substantially identical with the members 18ᵉ and 18ᶠ, which are shown in Fig. 1.

In a machine constructed substantially as described and illustrated, it will be seen that I have effected the following results: A variable transmission from the pulley 16 to the main drive shaft 14, through a friction-clutch and gears 19, 20, 20ᵇ, the clutch and gear shifts being manually controlled from the hand-lever L¹. An intermittent transmission for the concrete feeding means which may be adjusted to control the time at which each portion shall be fed and the quantity of such portion, through the instrumentalities of mutilated gears, ratchet and pawl and adjustable cam elements, described. The elevation and rotation of the packer-head through the counterweighted rocking lever and the intermeshing bevel-pinions. The raising and lowering of the top-ring which permits the removal and insertion of the mold.

It will also be obvious that as shown and described, all of said results follow automatically and in proper sequence, through the manual operation of the two levers L¹, L², when power is applied to the pulley 16.

While I have shown certain forms of transmission and mechanical movements in the construction of my improved tile making machine, these features may be modified without changing the results accomplished, and are not of the essence of my invention.

What I claim is:—

1. In a tile machine having a mold, a rotatable plunger adapted to coöperate with said mold, in receiving and distributing the material to be molded within said mold, means for rotating said plunger, and means for causing said plunger to proceed slowly in one direction through said mold and to withdraw quickly in an opposite direction through and from said mold, and to stop for a suitable period of time at its lowest position for the purpose of changing molds, and stopping again at the bottom of said mold for receiving and commencing the distribution of the charge, comprising, an interrupted gear, a gear meshing therewith having a pin extending laterally therefrom, a pivoted lever having a slot therein adapted to be engaged by said pin, and a link pivoted to one end of said lever and to a stem or spindle upon the outer end of which said plunger is mounted.

2. In a tile molding machine having a removable mold, a rotatable plunger adapted to coöperate with said mold in receiving and distributing the material to be molded therein, means for rotating said plunger, and means for causing said plunger to proceed slowly in one direction through said mold and to withdraw quickly in an opposite direction through and from said mold and to stop for a suitable period of time at its lowermost position for the purpose of replacing the mold, and to stop again at the bottom of said mold (on its upward movement) for the purpose of receiving and commencing the distribution of the charge, comprising a gear interrupted in a plurality of places, a second gear meshing therewith having a pin extending laterally therefrom, a counterbalanced centrally pivoted lever arm having a slot in its weighted end adapted to be engaged by said pin, a link one end of which is pivoted to the opposite end of said arm, the opposite end of said link being pivoted to a journal box supporting one end of a rotatable spindle upon the other end of which said plunger is mounted.

3. In a tile machine having a removable mold, a rotatable plunger adapted to coöperate with said mold in receiving and distributing the material to be molded within said mold, a lower mold supporting ring, guide posts between which said mold is supported by said rings, the lower ring being rigidly secured thereto and the upper ring being slidably mounted thereon, means for raising and lowering said upper ring relative to said lower ring, comprising a link pivoted at one end to said upper ring, a lever one end of which is pivoted to the other end of said link, the opposite end of said lever being pivoted to the frame of said machine, an arm integral with said lever and extending at substantially right angles therefrom, a roller mounted upon the end of said arm, a cam over which said roller is adapted to travel and means for rotating said cam, said means synchronizing with a means for causing the above said plunger to proceed slowly in one direction through said mold and to withdraw quickly in an opposite direction through and from said mold, and to stop for a suitable period of time at its lowermost position for the purpose of replacing the mold and to stop again at the bottom of said mold for receiving and commencing the distribution of the charge.

4. In a tile machine having a removable mold, a plunger adapted to coöperate with said mold, an upper mold supporting and centering ring, a lower mold supporting ring, guide posts between which said mold is supported by said rings, the lower ring being rigidly secured thereto and the upper ring being slidably mounted thereon, means for raising and lowering said upper ring relative to said lower ring, comprising, a link pivoted at one end to said upper ring, a lever, one end of which is pivoted to the other end of said link and the opposite end of said lever being pivoted to the frame of said machine, an arm integral with said lever and extending at substantially right angles therefrom, a roller journaled in the end of said arm, a cam over which said roller is adapted to travel, an interrupted gear integral with said cam and a lever train for causing the above said plunger to proceed slowly in one direction through said mold and to withdraw quickly in an opposite direction through and from said mold, and to stop for a period of time at its lowermost position and to stop again for a period of time at the bottom of said mold, the movement of said plunger moving devices and said mold supporting devices being synchronized by providing upon said interrupted gear the aforementioned cam as aforesaid.

5. In a tile machine having a mold, a rotatable plunger adapted to coöperate with said mold in receiving and distributing the material to be molded therein, means for rotating said plunger, comprising, a vertical squared spindle to the upper end of which said plunger is secured, a gear having a rectangular bearing through which said spindle passes and is adapted to be reciprocated, a shaft having a gear thereon coacting with said first mentioned gear and means for causing said plunger to proceed slowly in one direction through said mold and to withdraw quickly through and therefrom and to stop for a period of time at its lowermost position and to stop again upon its upward stroke at the bottom of said mold, comprising, a lever arm coöperating with said plunger, a gear having a pin extending transverse thereto adapted to coact with said lever arm, an interrupted gear in train with last mentioned gear, a continuous gear in rigid relation with said interrupted gear, and a worm on said shaft adapted to coact with said continuous gear.

6. In a tile machine having a mold, a rotatable plunger adapted to coöperate with said mold in receiving and distributing the material to be molded therein, means for rotating said plunger comprising a vertical square spindle to the upper end of which said plunger is secured, a rotatable gear, having a rectangular bearing through which said spindle is adapted to be reciprocated, and means for causing said plunger to proceed slowly in one direction through the mold and to withdraw quickly in an opposite direction through and from said mold, and to stop for a suitable period of time at its lowermost position for the purpose of replacing the mold, and stopping again at the bottom of said mold for receiving and commencing the distribution of the charge.

7. In a tile machine having a mold, a rotatable plunger adapted to coöperate with said mold, in receiving and distributing the material to be molded within said mold, means for rotating said plunger, and means for causing said plunger to proceed slowly in one direction through said mold and to withdraw quickly in an opposite direction through and from said mold, and to stop for a suitable period of time at its lowest position for the purpose of changing molds, and stopping again at the bottom of said mold for receiving and commencing the distribution of the charge, comprising, an interrupted gear, a gear meshing therewith having a pin extending laterally therefrom, a pivoted lever having a slot therein adapted to be engaged by said pin, and a link pivoted to one end of said lever and to a stem or spindle upon the outer end of which said plunger is mounted and means for intermittently delivering quantities of cement into said mold.

8. In a tile machine having a mold, a plunger adapted to coöperate therewith in receiving and distributing the material to be molded therein, means for centering and supporting said mold, means for rotating said plunger and means for causing said plunger to proceed slowly in one direction through said mold and to withdraw quickly in an opposite direction through and from said mold and to stop for a period of time at its lowermost position and to stop again at the bottom of said mold on its upward stroke.

9. In a tile machine having a mold, a plunger adapted to coöperate therewith in receiving and distributing the material to be molded therein, means for centering and supporting said mold, means for rotating said plunger and means for causing said plunger to proceed slowly in one direction through said mold and to withdraw quickly in an opposite direction through and from said mold and to stop for a period of time at its lowermost position and to stop again at the bottom of said mold on its upward stroke, and devices for delivering predetermined quantities of cement into said mold.

10. In a tile machine having a mold, a plunger adapted to coöperate therewith in receiving and distributing the material to be molded therein, means for centering and supporting said mold, means for rotating said plunger and means for causing said plunger to proceed slowly in one direction through said mold and to withdraw quickly in an opposite direction through and from said mold and to stop for a period of time at its lowermost position and to stop again at the bottom of said mold on its upward stroke, and means for rotating said plunger being actuated through a main drive shaft and the means for reciprocating said plunger being actuated through a worm rotatably mounted upon said drive shaft and a manually operated clutch for engaging and disengaging said worm with respect to said drive shaft.

11. In a tile machine having a mold, a rotatable plunger adapted to coöperate with said mold, in receiving and distributing the material to be molded within said mold, means for rotating said plunger, and means for causing said plunger to proceed slowly in one direction through said mold and to withdraw quickly in an opposite direction through and from said mold, and to stop for a suitable period of time at its lowest position for the purpose of changing molds, and stopping again at the bottom of said mold for receiving and commencing the distribution of the charge, comprising, an interrupted gear, a gear meshing therewith having a pin extending laterally therefrom, a pivoted lever having a slot therein adapted to be engaged by said pin, and a link pivoted to one end of said lever and to a stem or spindle upon the outer end of which said plunger is mounted, and devices for delivering predetermined quantities of cement into said mold.

12. In a tile machine having a removable mold, a rotatable plunger adapted to coöperate with said mold in receiving and distributing the material to be molded within said mold, a lower mold supporting ring, guide posts between which said mold is supported by said rings, the lower ring being rigidly secured thereto and the upper ring being slidably mounted thereon, means for raising and lowering said upper ring relative to said lower ring, comprising, a link pivoted at one end to said upper ring, a lever one end of which is pivoted to the other end of said link, the opposite end of said lever being pivoted to the frame of said machine, an arm integral with said lever and extending at substantially right angles therefrom, a roller mounted upon the end of said arm, a cam over which said roller is adapted to travel and means for rotating said cam, said means synchronizing with a means for causing the above said plunger to proceed slowly in one direction through said mold and to withdraw quickly in an opposite direction through and from said mold, and to stop for a suitable period of time at its lowermost position for the purpose of replacing the mold and to stop again at the bottom of said mold for receiving and commencing the distribution of the charge, and devices for delivering predetermined quantities of cement into said mold.

13. In a tile machine having a mold, a plunger adapted to coöperate therewith in receiving and distributing the material to be molded therein, means for centering and supporting said mold, means for rotating said plunger and means for causing said plunger to proceed slowly in one direction through said mold and to withdraw quickly in an opposite direction through and from said mold and to stop for a period of time at its lowermost position and to stop again at the bottom of said mold on its upward stroke, and devices for delivering predetermined quantities of cement into said mold, comprising a hopper with a cylindrical chamber, an arbor having paddle wheels connected therewith journaled to ride within said cylindrical chamber, a ratchet wheel secured to said arbor, a lever and pawl adapted to coact with said ratchet wheel, the movement of said pawl being synchronized with the reciprocable movement of said plunger through the instrumentalities of a worm mounted upon the main drive shaft and a plurality of gears fixed with relation to each other and in turn respectively with said feeding and reciprocating means.

14. In a tile machine having a mold, a plunger adapted to coöperate therewith in receiving and distributing the material to be molded therein, means for centering and supporting said mold, means for rotating said plunger and means for causing said plunger to proceed slowly in one direction through said mold and to withdraw quickly in an opposite direction through and from said mold and to stop for a period of time at its lowermost position and to stop again at the bottom of said mold on its upward stroke, and means for intermittently delivering charges to said mold comprising a hopper with a cylindrical chamber, an arbor having paddle blades connected therewith, journaled to rotate within said cylindrical chamber, a ratchet wheel secured to said arbor, a lever and pawl adapted to coact with said ratchet wheel, an adjustable tongue adapted to disengage said pawl from said ratchet wheel, the movement of said pawl being synchronized with the rotary and reciprocable movement of said plunger through the instrumentalities of a worm mounted upon the main drive shaft, a plurality of gears fixed with relation to each other and in train respectively with said feeding and reciprocating means.

15. In a tile machine having a mold, a plunger adapted to coöperate therewith in receiving and distributing the material to be molded therein, means for centering and supporting said mold, means for rotating said plunger and means for causing said plunger to proceed slowly in one direction through said mold and to withdraw quickly in an opposite direction through and from said mold and to stop for a period of time at its lowermost position and to stop again at the bottom of said mold on its upward stroke, and means for rotating said plunger being actuated through a main drive shaft and the means for reciprocating said plunger being actuated through a worm rotatably mounted upon said drive shaft, a clutch for engaging and disengaging said main drive shaft with a source of power and an independent clutch for engaging and disengaging said worm with respect to said drive shaft.

In testimony whereof I affix my signature in the presence of two witnesses.

GEORGE WEISS.

Witnesses:
WM. HAROLD EICHELMAN,
M. A. MILORD.

Copies of this patent may be obtained for five cents each, by addressing the "Commissioner of Patents, Washington, D. C."